United States Patent

Kang

[11] 3,882,379
[45] May 6, 1975

[54] MEANS FOR DETECTING CORONA WITHIN HIGH-VOLTAGE ELECTRICAL APPARATUS

[75] Inventor: Chi Lung Kang, Princeton, N.J.

[73] Assignee: General Electric Company, Philadelphia, Pa.

[22] Filed: Apr. 11, 1974

[21] Appl. No.: 460,237

[52] U.S. Cl. .................................................. 324/54
[51] Int. Cl. ...................... G01r 31/02; G01r 31/14
[58] Field of Search .................... 324/51, 52, 54, 72

[56] References Cited
UNITED STATES PATENTS

| | | | |
|---|---|---|---|
| 2,170,813 | 8/1939 | Doble et al. | 324/54 |
| 2,307,499 | 1/1943 | Frakes | 324/54 |
| 2,402,466 | 6/1946 | Terpak et al. | 324/54 |
| 2,679,026 | 5/1954 | Frakes | 324/54 |
| 3,015,774 | 1/1962 | Eigen | 324/54 |
| 3,346,808 | 10/1967 | Bader | 324/54 |
| 3,363,172 | 1/1968 | Doble | 324/54 |
| 3,439,265 | 4/1969 | Strom | 324/54 |
| 3,710,242 | 1/1973 | Povey | 324/54 |
| 3,801,899 | 4/1974 | Liao | 324/54 X |

*Primary Examiner*—Gerard R. Strecker
*Attorney, Agent, or Firm*—J. Wesley Haubner; William Freedman

[57] ABSTRACT

Means for detecting the presence of corona within electrical apparatus comprises two individual sensors, each of which develops an output signal containing a component representative of corona within the apparatus and another component representative of externally-generated noises entering through the high voltage terminal bushing of the apparatus. One sensor is coupled to the main current path through the bushing and the other to a tap across a portion of the bushing capacitance. The output signals from these individual sensors are modified and combined in such a manner that the components in the signals representative of externally-generated noise substantially cancel each other, thus producing a resultant signal representing corona within the apparatus but substantially free of the effects of externally-generated noise entering through said bushing.

6 Claims, 4 Drawing Figures

MEANS FOR DETECTING CORONA WITHIN HIGH-VOLTAGE ELECTRICAL APPARATUS

BACKGROUND

This invention relates to means for detecting corona within high-voltage electrical apparatus and, more particularly, relates to corona-detecting means which is able to develop an output signal that is representative of corona intensity within the electrical apparatus but is substantially independent of noises entering the apparatus from its exterior.

To detect corona inside of electric apparatus (e.g., a power transformer or reactor), it has been proposed that a suitable sensor coupled to the power circuit of the electric apparatus be used to sense the electrical signal resulting from the corona within the apparatus. Unavoidably, in the input to such a sensor, noises from external sources appear simultaneously with the electrical signal from the internal corona. When the noise components are of a relatively high value, the signal-to-noise ratio of the sensor output becomes low, and this makes it difficult to use this output for accurate detection of internal corona. Assuming that the apparatus includes a high-voltage terminal bushing connected to a transmission line, most of these noises components are generated on the transmission line and enter the apparatus through this high-voltage terminal bushing.

SUMMARY

A general object of my invention is to provide corona-detecting means which can develop an output signal representative of corona intensity within the electrical apparatus but substantially insensitive to noises generated externally of the apparatus and entering through the high-voltage terminal bushing of the apparatus.

My corona detector comprises a plurality of individual sensors, each of which develops an output signal containing a component representative of corona within the apparatus and another component representative of externally-generated noises entering through the high voltage terminal bushing.

An object of my invention is to modify and combine the output signals from these individual sensors in such a manner that the components therein representing externally-generated noise entering through the high-voltage bushing substantially cancel each other, thus producing a resultant signal which represents corona within the apparatus but is substantially free of the effects of externally-generated noise entering through the high-voltage bushing.

In carrying out the invention in one form, I utilize my detecting means for detecting the presence of corona within apparatus comprising: a housing, a high voltage working part within the housing, and a terminal bushing extending through a wall of the housing for carrying current between a transmission line and the working part. This bushing comprises a conductor having a first end inside the housing and connected to the working part and a second end outside the housing for connection to the transmission line, a body of insulation surrounding the conductor, a ground sleeve around said body, a tubular shield embedded in said body and surrounded by the ground sleeve, and a tap extending between the shield and ground sleeve. The electrical apparatus further includes means for defining a conductive path between the ground sleeve and ground. The detecting means comprises: (a) means including a first sensor surrounding the bushing conductor and the shield at a location effectively between said conductive path and the second end of said bushing conductor for deriving a first signal substantially proportional to $I_1 - I_2$, where $I_1$ is the total current in a predetermined high frequency band flowing into said bushing conductor from said working part and is constituted by $I_{S1} - I_{N1}$, where $I_{S1}$ is a signal current component originating within said apparatus and indicative of corona therein and $I_{N1}$ is a noise current component originating outside said apparatus and flowing through said bushing conductor from said transmission line via said first end; and $I_2$ is the total current in said predetermined high frequency band flowing between said bushing conductor and said shield through said body of insulation, (b) means sensitive to current in said tap for deriving a second signal substantially proportional to $I_2$, and (c) means for receiving said first and second signals and for developing a third signal substantially proportional to $$(I_1 - I_2) + (1 + \frac{Z_2}{Z_1}) I_2$$

, where $Z_1$ is the impedance in said high frequency band of said working part and $Z_2$ is the impedance in said high frequency band between said bushing conductor and ground presented to current flowing through said insulating body between said bushing conductor and said shield.

BRIEF DESCRIPTION OF DRAWINGS

For a better understanding of the invention, reference may be had to the following description taken in connection with the accompanying drawings, wherein.

DETAILED DESCRIPTION OF PREFERRED EMBODIMENTS

Figure 1:
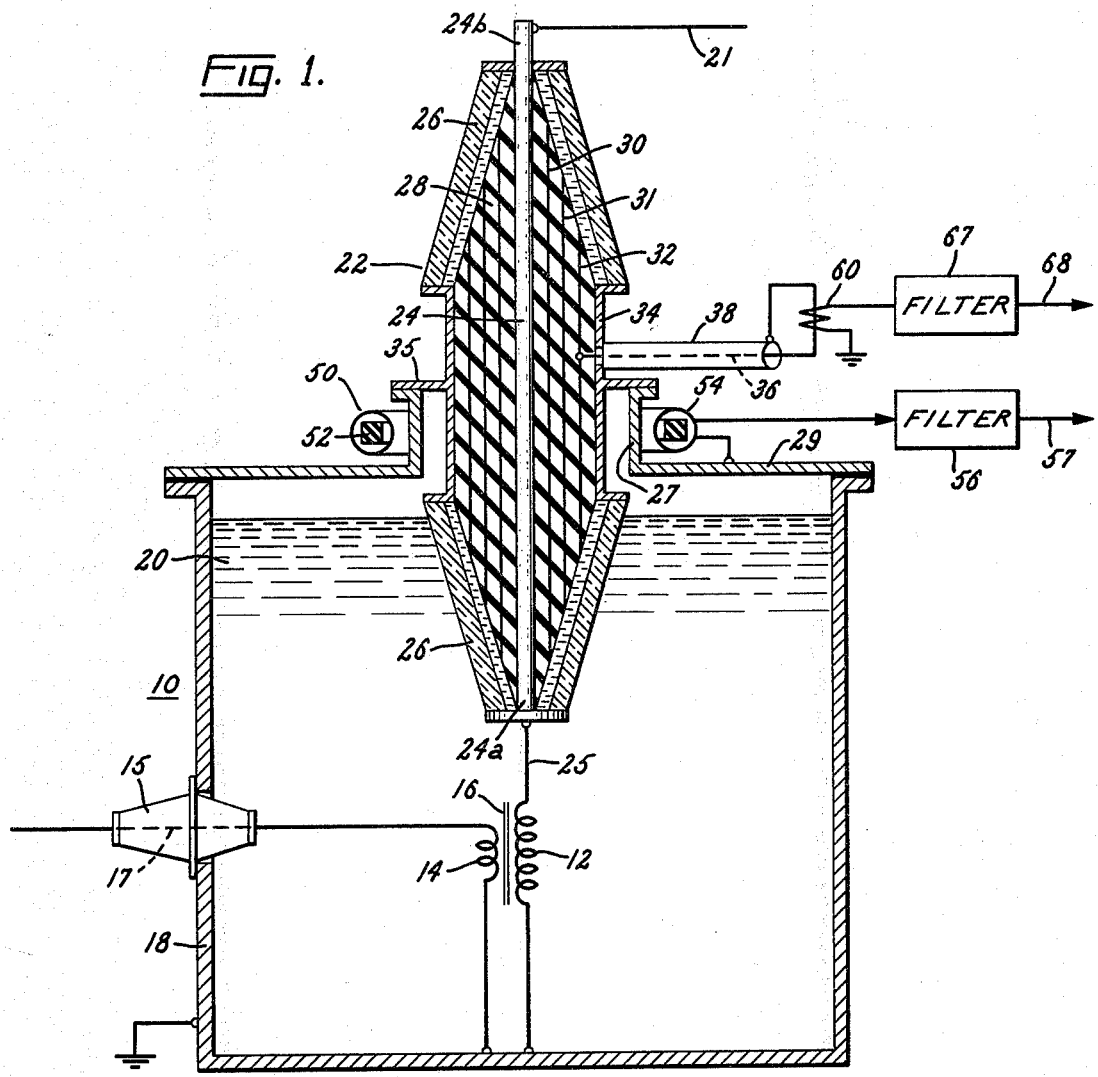
FIG. 1 is side elevational view, partly in section and partly schematic, showing a portion of corona-detecting means embodying one form of my invention.

Referring now to FIG. 1, the induction apparatus schematically shown therein is a single-phase power transformer 10 comprising a high voltage winding 12, a low voltage winding 14, and an iron core 16 through which the windings are inductively coupled in a conventional way. The transformer also comprises a grounded metal tank 18 in which the windings 12 and 14 are located and liquid dielectric 20, such as oil, within the tank in which the windings are immersed. In the illustrated embodiment, each of the windings 12 and 14 has its lower terminal connected to ground. The upper terminal of the low voltage winding 14 is connected to the conductor 17 of a suitable low-voltage terminal bushing 15.

For carrying current between an external transmission line 21 and the high-voltage winding 12, a high-voltage terminal bushing 22 is provided. This terminal bushing 22 comprises a high-voltage conductor 24 having its lower end 24a disposed within the tank 18 and electrically connected through a lead 25 to the high voltage end of the high voltage winding 12 and its upper end 24b connected to the external transmission line 21. Surrounding the bushing conductor 24 is a porcelain shell 26 that supports the bushing conductor and electrically isolates if from the grounded tank 18. The mid-portion of the bushing fits within a tubular metallic bushing pocket 27 that projects upwardly from its integral with the cover 29 of the tank 18.

The bushing is a conventional condenser-type high voltage bushing which includes an insulating core 28 located within the porcelain shell and surrounding the conductor 24 and oil filling the space between the core 28 and the shell 26. Embedded within and disposed in concentric spaced-apart relation within the core 28 are tubular, conductive voltage-grading shields 30, 31, 32, each of which defines a cylindrical surface along which appears a voltage that is a fixed percentage of the voltage between the high voltage conductor 24 and ground. A tubular ground sleeve 34 of metal surrounds the core 28 and has a radially-projecting metal flange 35 supporting the bushing on the bushing pocket 27. Between the outer shield 32 and the tubular ground sleeve 34, two spaced-apart leads 36 and 38 are connected to provide a current path for the capacitance current flowing between the high-voltage conductor 24 and shield 32 through the capacitance present between these parts 24 and 32. Lead 38 preferably is a tubular conductor surrounding the lead 36 and coaxially disposed relative to lead 36. The leads 36 and 38, taken together, are referred to hereinafter as a tap.

Figure 2:
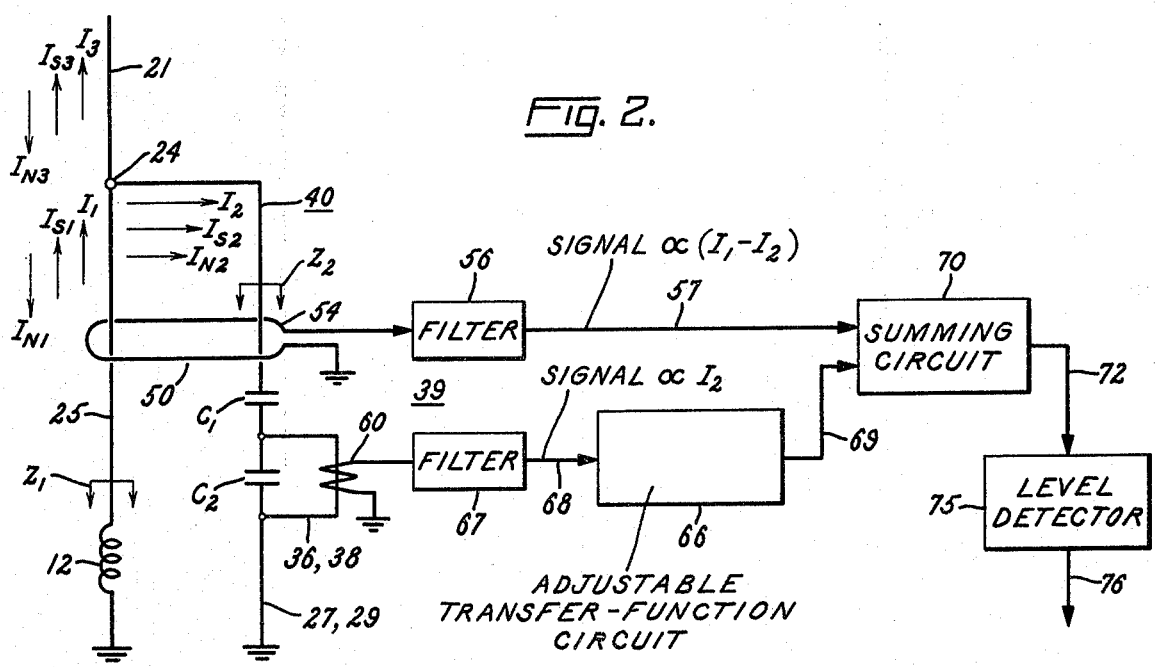
FIG. 2 is a diagrammatic showing of the corona-detecting means of FIG. 1. Certain additional components are depicted in FIG. 2.

The apparatus illustrated in FIG. 1 can be depicted in simplified circuit form as shown in FIG. 2. Referring to FIG. 2, the bushing conductor 24 is depicted as a single junction point for three circuit branches. One branch is the transmission line 21; another branch is the connection 25 between the lower end of the bushing conductor 24 and winding 12; and the remaining branch 40 is the path from conductor 24 through the capacitance of the bushing to ground. The path 40 contains the series combination of capacitances $C_1$ and $C_2$, where $C_1$ is the capacitance present between the conductor 24 and shield 32, and $C_2$ is the capacitance that is present between the shield 32 and ground. In the illustrated embodiment, the tap 36, 38 which extends between shield 32 and ground effectively shorts out the capacitance $C_2$.

A corona detecting circuit 39 embodying one form of our invention is illustrated in FIG. 2. This corona-detecting circuit 39 comprises two separate sensors 50, 56 and 60, 67 for deriving input signals from the apparatus 10, circuits 66 and 70 for processing these input signals to produce an output at 72, and a level detector 75 responsive to this output at 72. This corona detecting circuit 39 and its various components will soon be described in greater detail.

In FIG. 2, the total high-frequency current in branch 25 is designated $I_1$ and consists of two components $I_{S1}$, the signal current component in branch 25, which originates within tank 18, and $I_{N1}$, the noise current component in branch 25, which originates outside the tank 18. The total high-frequency current in branch 40 is designated $I_2$ and consists of two components $I_{S2}$, the signal current component in branch 40, and $I_{N2}$, the noise current component in branch 40. The total high-frequency current in branch 21 is designated $I_3$ and consists of two components $I_{S3}$, the signal current component in branch 21, which orginates within tank 18, and $I_{N3}$ the noise current component in branch 21, which originates outside the tank. These currents and their respective directions are shown in FIG. 2. All the currents referred to in this paragraph are high frequency currents within a predetermined high frequency band corresponding to the frequency band at which the corona detecting circuit 39 operates, as such band is established by any filters present in the circuit, e.g., the filters 56 and 67 (soon to be described).

$Z_1$ is the high frequency input impedance to the transformer winding and, more specifically, the impedance between conductor 24 and ground via the transformer winding 12. $Z_2$ is the high frequency impedance of the branch 40 to ground between the conductor 24 and ground. These high frequency impedances $Z_1$ and $Z_2$ are impedances at frequencies within the same predetermined high frequency band as referred to in the immediately preceding paragraph.

As will be evident from FIG. 2, the following relationships are present between the currents in each branch:

$$I_1 = I_{S1} - I_{N1} \tag{1}$$

$$I_2 = I_{S2} + I_{N2} \tag{2}$$

$$I_3 = I_{S3} - I_{N3} \tag{3}$$

The following additional relationships are also present:

$$I_{N3} = I_{N1} + I_{N2} \tag{4}$$

$$I_{S1} = I_{S2} + I_{S3} \tag{5}$$

In view of the relationship of equation (4) and the fact that the two parallel paths containing impedances $Z_1$ and $Z_2$, respectively, are connected between common terminal points (24 and ground), it will be apparent that the voltage drops across these two paths resulting from noise current components $I_{N1}$ and $I_{N2}$ flowing therethrough are equal. This can be expressed as follows:

$$I_{N1}Z_1 = I_{N2}Z_2 \tag{6}$$

Therefore, $$I_{N2} = \frac{Z_1}{Z_2} I_{N1} \tag{7}$$

Substituting $(Z_1/Z_2) I_{N1}$ into equation (2) for $I_{N2}$, the following equation can be written:

$$I_2 = I_{S2} + \frac{Z_1}{Z_2} I_{N1} \tag{8}$$

Multiplying through $(Z_2/Z_1)$ results in the following:

$$\frac{Z_2}{Z_1} I_2 = \frac{Z_2}{Z_1} I_{S2} + I_{N1} \tag{9}$$

To eliminate $I_{N1}$, equations (1) and (9) are added to produce the following:

$$I_1 + \frac{Z_2}{Z_1} I_2 = I_{S1} + \frac{Z_2}{Z_1} I_{S2} \tag{10}$$

If $-I_2 + I_2$ is added to equation (10), the following will result:

$$I_1 - I_2 + I_2 + \frac{Z_2}{Z_1}I_2 = I_{S1} + \frac{Z_2}{Z_1}I_{S2} \qquad (11)$$

This can be simplified into:

$$(I_1 - I_2) + (1 + \frac{Z_2}{Z_1})I_2 = I_{S1} + \frac{Z_2}{Z_1}I_{S2} \qquad (12)$$

The quantity at the right hand side of equation (12) represents corona intensity within the transformer 10 and, most importantly, is free of noise components. Accordingly, a signal having a value equaling this quantity can be used for corona detection. The left hand side of equation (12) is such a signal, and its components are derivable from the branches of the circuit depicted in FIG. 2.

For deriving a signal proportional to $I_1 - I_2$, I provide a sensor in the form of a conventional high-frequency current transformer 50 of the air core type and a conventional filter 56 to which the output from the current transformer is supplied. The current transformer 50 comprises a core 52 of non-magnetic material surrounding its primary conductor 24 and a secondary winding 54 having a relative small number of turns wound onto this core 52. The air core construction and the relatively small number of secondary turns renders the current transfomer substantially insensitive to low frequency currents, such as power frequency currents. The filter 56 allows only signals in a predetermined band of high frequencies to appear in the output from the sensor at 57.

In a preferred form of the invention, the secondary of current transformer 50 is located outside the tank 18 around the high-voltage terminal bushing and, preferably, around the bushing pocket 27. The ground sleeve 34 may be thought of as being connected to ground through a conductor constituted by the bushing pocket 27 and the walls of tank 18. Accordingly, the capacitance current flowing between conductor 24 and ground through the capacitance of the bushing follows a path extending through the capacitance present between conductor 24 and shield 32 and then through tap 36, 38, then through the bushing pocket 27 within the window of current transformer 50, and then through the tank wall to ground. This is the path designated 40 in FIG. 2. It will be apparent from FIG. 1 that the secondary of current transformer 50 is effectively located between the upper terminal 24b of the bushing and the portion of conductive path 40 that connects the ground sleeve 34 to ground.

For deriving a signal proportional to $I_2$, the secondary of an air-core current transfomer 60 of the same type as above described is provided around the tap 36, 38. The output from current transformer 60 is fed to a filter 67 tuned to the same band of frequencies as the other filter 56. As shown in FIG. 2, the output from filter 67 appearing at 68 is supplied to a conventional adjustable transfer-function circuit 66 which is preadjusted to produce an output proportional to $1 + (Z_2/Z_1)$ times its input signal. Since $Z_2$ and $Z_1$ are known quantities, the circuit 66 can readily be preadjusted to respond to this manner. To provide for the adjustable transfer function, circuit 66 includes suitable means for adjusting its gain and phase-shift.

The output at 57 from the first sensor 50, 56 and the output at 69 from the adjustable transfer-function circuit 66 are supplied as two input signals to a suitable summing circuit 70 which produces an output at 72 proportional to the sum of these input signals. This output is supplied to a suitable level detector 75 which develops an output at 76 when the input thereto exceeds a predetermined value. If the input to the level detector is below this predetermined value, no output appears at 76.

It will be apparent from the above that level detector 75 develops an output at 76 whenever the quantity $$(I_1 - I_2) + (1 + \frac{Z_2}{Z_1})I_2$$

exceeds a predetermined value. Since, as explained above in connection with equation (12), this quantity represents corona intensity within the transformer substantially free of noise components from transmission line 21, it will be apparent that operation of the level detector 75 will occur in response to a predetermined corona intensity within the transformer 10 substantially unaffected by noise from transmission line 21.

Although I have shown only two filters (56 and 67) in the detecting circuit 39, it is to be understood that additional filtering means could be used following the summing circuit 70 to control the effective frequency band width for operation of the detecting circuit 39.

It is noted with respect to the embodiment of FIGS. 1 and 2 that the location of the secondary of current transformer 50 around the bushing pocket 27 is especially advantageous because it enables this secondary to be applied to apparatus already in service without modifying the internal components of the apparatus and without even entering the apparatus tank (18). Because this secondary is in a region that is at substantially ground potential, the insulation around it does not need to withstand high voltages and can be relatively inexpensive.

Figure 3:
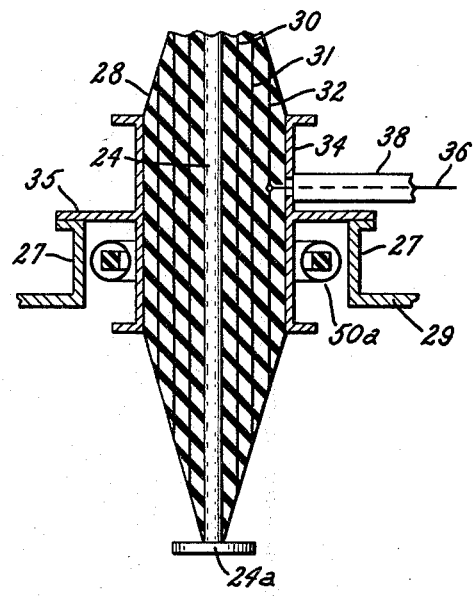
FIG. 3 is a side elevation view, partly schematic, showing a portion of modified corona-detecting means.

In a modified form of my invention illustrated in FIG. 3, I place the secondary of the current transformer (designated 50a) inside the tank and around sleeve 34. When the current transformer secondary is so situated, it is no longer effectively located between the upper terminal 24b of the bushing and the connection 35, 27, 29 between the ground sleeve 34 and ground, as in FIG. 1. In FIG. 3, the location of the secondary is effectively between the lower bushing terminal 24a and the connection 35, 27, 29 between the ground sleeve 34 and ground. A current transformer secondary in the position of FIG. 3 will have an output proportional to $I_1$ rather than $I_1 - I_2$, as in FIGS. 1 and 2. This is the case because in FIG. 3, $I_2$ flows to ground from conductor 24 via a path outside the window of the current transformer 50a rather than inside this window as in FIG. 1.

The output from the secondary of current transformer 50a of FIG. 3 can be readily utilized in combination with the output from the current sensor 60 of FIG. 1 to obtain a final output proportional to the right hand side of equation (12), i.e., $$I_{S1} + \frac{Z_2}{Z_1}I_{S2}$$

Figure 4:
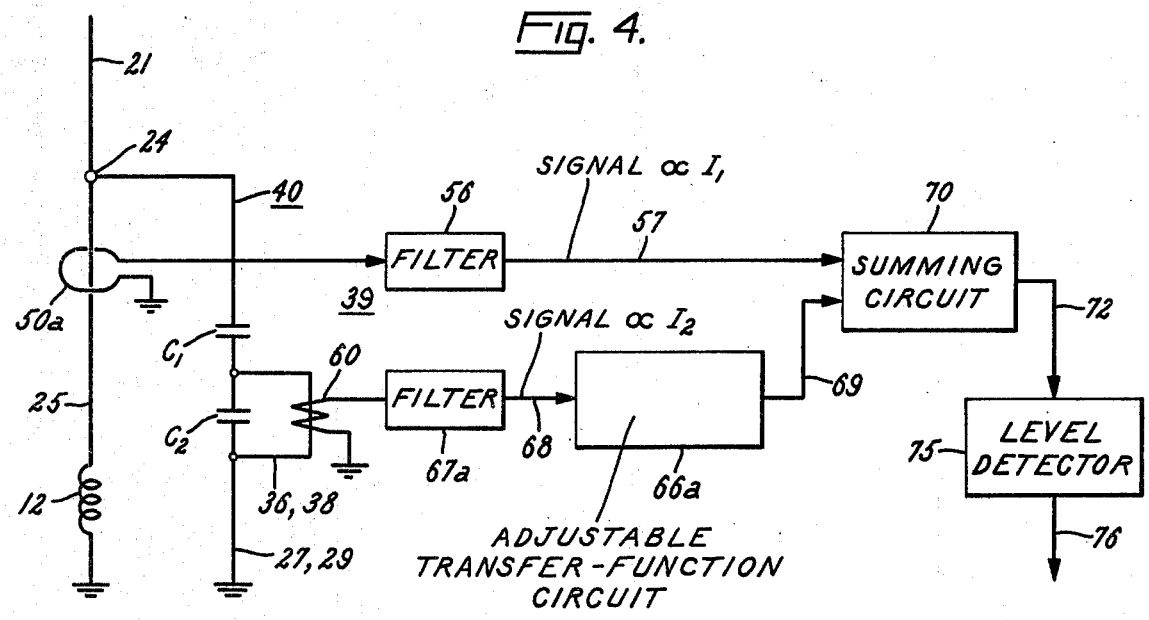
FIG. 4 is a diagrammatic showing of the corona-detecting means of FIG. 3. Certain additional components are depicted in FIG. 4.

This is accomplished in the manner represented by equation (10) and illustrated in FIG. 4. More specifically, the output at 68 in FIG. 4 is fed to a conventional adjustable transfer-function circuit 66a (corresponding to 66 in FIG. 2) which is preadjusted to develop an output at 69 equal to $(Z_2/Z_1)$ times its input, and, more specifically, an output proportional to $(Z_2/Z_1) I_2$. This output from circuit 66a appearing at 69 is supplied to the summing circuit 70 as one input, and the output at 57 from filter 56, which is proportional to $I_1$, is supplied to the summing circuit 70 as another input. As will be apparent from equation (10), this summing operation of circuit 70 results in an output proportional to $I_{S1} + (Z_2/Z_1) I_{S2}$. As previously explained, this quantity represents corona intensity within the transformer 10 substantially free of noise components from transmission line 21.

It is possible to utilize the present invention even though $Z_1$ and $Z_2$ are not known. This can be done by first removing power from low voltage conductor 17 of the transformer and from the transmission line 21 and then applying to the transmission line 21 signals developed by an appropriate repetitive generator. The rise time of each of these pulses should be short enough to generate high frequency components in the same general frequency range as the noise typically encountered on the line 21. The voltage developed across transformer winding 12 by these pulses may be very low, e.g., a few volts. Since the transformer is effectively deenergized, no corona will be present therein and the output at 72 in FIG. 2 should be zero if the effects of noise are being successfully canceled out. The transfer function of circuit 66 of FIG. 2 is then adjusted (by adjusting its gain and phase-shift characteristics) until the effects of the simulated noise disappear in the output at 72, more specifically, until the output at 72 is substantially zero. When this has been done, the circuit 66 should be producing an output at 69 substantially $[1 + (Z_2/Z_1)]$ times its input. With the circuit 66 so adjusted, noise effects developed on the transmission line 21 will be canceled out when the transformer is again energized, and an output at 72 can be developed indicative of corona within the transformer and substantially free of noise developed on transmission line 21.

The same technique can be used in the connection with the apparatus of FIGS. 3 and 4. That is, adjustable transfer-function circuit 66a is adjusted under the same conditions (i.e., with the transformer deenergized and simulated noise present on line 21) until the output at 72 is substantially zero.

It is recognized that some noise current will enter the transformer through its secondary bushing 15 from the external secondary circuit, but in many applications this noise current is sufficiently attenuated within the transformer so that it does not significantly detract from the performance of the disclosed detection scheme. If greater sensitivity is needed, an additional corona detector substantially the same as that associated with the primary bushing 22 can be installed in association with the secondary bushing.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim is:

1. Means for detecting the presence of corona within electrical apparatus comprising: a housing; a high-voltage working part within said housing; and a terminal bushing extending through a wall of said housing for carrying current between a transmission line and said working part, said terminal bushing comprising: a (i) bushing conductor having a first end inside said housing connected to said working part and a second end located outside said housing and adapted to be connected to said transmission line, (ii) a body of electrical insulation surrounding said bushing conductor, (iii) a ground sleeve around a portion of said body of insulation, (iv) a tubular shield embedded in said insulation, surrounding said bushing conductor, and surrounded by said ground sleeve, and (v) a tap extending between said shield and said ground sleeve; and means defining a conductive path between said ground sleeve and ground; said detecting means comprising:

a. means including a first sensor surrounding said bushing conductor and said shield at a location effectively between said conductive path and said second end of said bushing conductor for deriving a first signal substantially proportional to $I_1 - I_2$, where $I_1$ is the total current in a predetermined high-frequency band flowing into said bushing conductor from said working part and is constituted by $I_{S1} - I_{N1}$, where $I_{S1}$ is a signal current component originating within said apparatus and indicative of corona therein and $I_{N1}$ is a noise current component originating outside said apparatus and flowing through said bushing conductor from said transmission line via said first end; and $I_2$ is the total current in said predetermined high frequency band flowing between said bushing conductor and said shield through said body of insulation,
   b. means sensitive to current in said tap for deriving a second signal substantially proportional to $I_2$,
   c. and means for receiving said first and second signals and for developing a third signal substantially proportional to $$(I_1 - I_2) + (1 + \frac{Z_2}{Z_1}) I_2$$

, where $Z_1$ is the impedance in said predetermined high frequency band of said working part and $Z_2$ is the impedance in said predetermined high frequency band between said bushing conductor and ground presented to current flow through said insulating body between said bushing conductor and said shield.

2. The corona detecting means of claim 1 in which said means of (c) comprises:
   a. means for receiving said second signal and developing an intermediate signal substantially proportional to $[1 + (Z_2/Z_1)] I_2$, and
   b. summing means receiving said first and said intermediate signals for developing a signal constituting said third signal which is substantially proportional to the sum of said first and said intermediate signals.

3. Means for detecting the presence of corona within electrical apparatus comprising: a housing; a high-voltage working part within said housing; a terminal bushing extending through a wall of said housing for carrying current between a transmission line and said working part, said terminal bushing comprising: (i) a bushing conductor having a first end located inside said housing connected to said working part and a second end located outside said housing and adapted to be connected to said transmission line, (ii) a body of electrical insulation surrounding said bushing conductor, (iii) a ground sleeve around a portion of said body of insulation, (iv) a tubular shield embedded in said insulation, surrounding said bushing conductor, and surrounded by said groove sleeve, and (v) a tap extending between said shield and said ground sleeve; and means defining a conductive path between said ground sleeve and ground; said detecting means comprising:

a. means including a first sensor surrounding said bushing conductor and said shield at a location between said conductive path and said first end of said bushing conductor for deriving a first signal substantially proportional to $I_1$, where $I_1$ is the total current in a predetermined high frequency band flowing into said bushing conductor from said working part and is constituted by $I_{S1} - I_{N1}$, where $I_{S1}$ is a signal current component originating within said apparatus and indicative of corona therein and $I_{N1}$ is a noise current component originating outside said apparatus and flowing through said bushing conductor from said transmission line via said first end, b. means sensitive to current in said tap for deriving a second signal substantially proportional to $I_2$, where $I_2$ is the total current in said predetermined high frequency band flowing through said tap, c. and means for receiving said first and second signals and for developing a third signal of $(Z_2/Z_1) I_2$, where $Z_1$ is the impedance in said predetermined high frequency band of said working part and $Z_2$ is the impedance in said predetermined high frequency band between said bushing conductor and ground presented to current flowing through said insulating body between said bushing conductor and said shield.

4. The corona detecting means of claim 3 in which said means of (c) comprises:

a. means for receiving said second signal and developing an intermediate signal substantially proportional to $(Z_2/Z_1) I_2$, and b. summing means receiving said first and said intermediate signals for developing a signal constituting said third signal which is substantially proportional to the sum of said first and said intermediate signals.

5. Means for detecting the presence of corona within electrical apparatus comprising: a housing; a high-voltage working part within said housing; and a terminal bushing extending through a wall of said housing for carrying current between a transmission line and said working part, said terminal bushing comprising: a (i) bushing conductor having a first end inside said housing connected to said working part and a second end located outside said housing and adapted to be connected to said transmission line, (ii) a body of electrical insulation surrounding said bushing conductor, (iii) a ground sleeve around a portion of said body of insulation, (iv) a tubular shield embedded in said insulation, surrounding said bushing conductor, and surrounded by said ground sleeve, and (v) a tap extending between said shield and said ground sleeve; and means defining a conductive path between said ground sleeve and ground; said detecting means comprising:

a. means including a first sensor surrounding said bushing conductor and said shield at a location between said conductive path and said second end of said conductor for deriving a first signal substantially proportional to $I_1 - I_2$, where $I_1$ is the total current in a predetermined high-frequency band flowing into said bushing conductor from said working part and is constituted by $I_{S1} - I_{N1}$, where $I_{S1}$ is a signal current component originating within said apparatus and indicative of corona in said apparatus and $I_{N1}$ is a noise current component originating outside said apparatus and flowing through said bushing conductor from said transmission line via said first end; and $I_2$ is the total current in said predetermined high frequency band flowing between said bushing conductor and said shield through said body of insulation, b. means sensitive to current in said tap for deriving a second signal substantially proportional to $I_2$, c. adjustable transfer-function circuit means for receiving said second signal and developing a third signal proportional by a predetermined factor to $I_2$, d. summing means receiving said first and third signals for developing a fourth signal substantially proportional to the sum of said first and third signals, e. said predetermined factor of (c) being determined by adjusting the transfer function of said circuit means so that said fourth signal is substantially zero under conditions in which: (i) said electrical apparatus is developing no corona and (ii) noise in said predetermined high frequency band is present on said transmission line sufficient to cause said first and third signals to be developed.

6. Means for detecting the presence of corona within electrical apparatus comprising a housing; a high-voltage working part within said housing; and a terminal bushing extending through a wall of said housing for carrying current between a transmission line and said working part, said terminal bushing comprising: (i) a bushing conductor having a first end located inside said housing connected to said working part and a second end located outside said housing and adapted to be connected to said transmission line, (ii) a body of electrical insulation surrounding said bushing conductor, (iii) a ground sleeve around a portion of said body of insulation, (iv) a tubular shield embedded in said insulation, surrounding said bushing conductor, and surrounded by said sleeve, and (v) a tap extending between said shield and said ground sleeve; and means defining a conductive path between said ground sleeve and ground; said detecting means comprising:

a. means including a first sensor surrounding said bushing conductor and said shield at a location between said conductive path and said first end of said bushing conductor for deriving a first signal substantially proportional to $I_1$, where $I_1$ is the total current in a predetermined high frequency band flowing into said bushing conductor from said working part and is constituted by $I_{S1} - I_{N1}$, where $I_{S1}$ is a signal current component originating within said apparatus and indicative of corona therein and $I_{N1}$ is a noise current component originating outside said apparatus and flowing through said bushing conductor from said transmission line via said first end,
b. means sensitive to current in said tap for deriving a second signal substantially proportional to $I_2$, where $I_2$ is the total current in said predetermined high frequency band flowing through said tap,
c. adjustable transfer-function circuit means for receiving said second signal and developing a third signal proportional by a predetermined factor to $I_2$,
d. summing means receiving said first and third signals for developing a fourth signal substantially proportional to the sum of said first and third signals,
e. said predetermined factor of (c) being determined by adjusting the transfer function of said circuit means so that said fourth signal is substantially zero under conditions in which: (i) said electrical apparatus is developing no corona and (ii) noise in said predetermined high frequency band is present on said transmission line sufficient to cause said first and third signals to be developed.

* * * * *